United States Patent [19]
Kuriyama

[11] Patent Number: 5,424,909
[45] Date of Patent: Jun. 13, 1995

[54] PACKAGE-TYPE SOLID ELECTROLYTIC CAPACITOR

[75] Inventor: Chojiro Kuriyama, Kyoto, Japan
[73] Assignee: Rohm Co., Ltd., Kyoto, Japan
[21] Appl. No.: 253,556
[22] Filed: Jun. 3, 1994
[30] Foreign Application Priority Data

| Jun. 15, 1993 | [JP] | Japan | 5-143669 |
| Jun. 21, 1993 | [JP] | Japan | 5-149039 |
| Mar. 31, 1994 | [JP] | Japan | 6-062948 |

[51] Int. Cl.$^6$ ............ H01G 1/10; H01G 9/00
[52] U.S. Cl. ................ 361/534; 361/523
[58] Field of Search ......... 361/830, 301.3, 328, 361/523, 539, 541, 272, 275.1, 534, 15, 16, 17; 174/52.2, 52.4; 264/272.11, 272.14, 272.18; 29/25.03, 25.42

[56] References Cited
U.S. PATENT DOCUMENTS

| 4,935,848 | 6/1990 | Yamane | 361/534 |
| 4,975,796 | 12/1990 | MacDougall | 361/16 |
| 5,063,340 | 11/1991 | Kalenowsky | 361/16 |

FOREIGN PATENT DOCUMENTS

| 488130 | 6/1992 | European Pat. Off. |
| 2-105513 | 4/1990 | Japan |
| 5-275285 | 10/1993 | Japan |

Primary Examiner—Bruce A. Reynolds
Assistant Examiner—Michael D. Switzer
Attorney, Agent, or Firm—William H. Eilberg

[57] ABSTRACT

A package-type solid electrolytic capacitor is provided which comprises a capacitor element including a chip from which an anode wire partially projects out, a resin package enclosing the capacitor element, and a diode also enclosed in the package. The diode has a negative pole electrically connected to the anode wire, and a positive pole electrically connected to the chip. The diode is designed to allow passage therethrough of a forward current under a forward bias which is lower than the reverse dielectric breakdown voltage of the capacitor element.

9 Claims, 5 Drawing Sheets

PACKAGE-TYPE SOLID ELECTROLYTIC CAPACITOR

BACKGROUND OF THE INVENTION

1. Field of the Invention

This invention relates to a solid electrolytic capacitor, such as tantalum capacitor or aluminum capacitor, which comprises a capacitor element enclosed in a resin package.

2. Description of the Related Art

As disclosed in Japanese Patent Application Laid-open No. 2(1990)-105513 for example, a typical solid electrolytic capacitor comprises a capacitor element which includes a capacitor chip and an anode wire projecting from the chip. The capacitor also includes an anode lead in electrical connection with the anode wire, and a cathode lead in electrical connection to the chip. The capacitor element together with part of the respective leads is enclosed in a resin package, and the respective leads are bent outside the resin package for conveniently mounting to a surface of a circuit board (not shown).

The capacitor chip is conventionally prepared in the following manner. Specifically, an amount of tantalum powder is first compacted into a porous body together with the anode wire, and the compact is then sintered. Then, the sintered porous compact is oxidized to form a dielectric substance (e.g. tantalum pentoxide). Then, the oxidized porous compact is subjected to a treatment for forming a solid electrolytic substance (e.g. manganese dioxide). Finally, the thus treated compact is graphitized and metalized (by silver or nickel plating for example) for forming a cathode layer.

As is well known, a solid electrolytic capacitor is a polar component. Thus, if a reverse bias is applied to the capacitor element due to reverse polarity mounting of the capacitor relative to a circuit board or due to some trouble in the circuitry, the capacitor element may be dielectrically broken down when the reverse bias exceeds the reverse dielectric breakdown voltage of the capacitor element.

The reverse dieletric breakdown voltage of the capacitor element may be increased by increasing the layer thickness of the dielectric substance formed in the capacitor chip. However, such a solution results in a capacitance decrease of the capacitor because the capacitance of the capacitor is inversely proportional to the layer thickness of the dielectric substance. An attempt to decrease the layer thickness of the dielectric substance for increasing the capacitance of the capacitor will cause the capacitor element to dielectrically break down even at a relatively low reverse bias.

SUMMARY OF THE INVENTION

It is, therefore, an object of the present invention to provide a solid electrolytic capacitor which, while avoiding a decrease of the capacitance, is prevented from dieletrically broken down even if a reverse bias is unexpectedly applied to the capacitor element.

According to the present invention, there is provided a package-type solid electrolytic capacitor comprising: a capacitor element including a chip having a cathode terminal, the capacitor element further including an anode terminal electrically separated from the cathode terminal; and a package enclosing the capacitor element; wherein the capacitor further comprises a diode enclosed in the package, the diode having a negative pole electrically connected to the anode terminal of the capacitor element, the diode further having a positive pole electrically connected to the cathode terminal of the chip; and wherein the diode allows passage therethrough of a forward current under a forward bias which is lower than a reverse dielectric breakdown voltage of the capacitor element.

The diode may be a rectifier diode. Alternatively or preferably, the diode may be a Zener diode having, under reverse bias, a Zener voltage which is lower than a forward dielectric breakdown voltage of the capacitor element.

The capacitor may further comprise an anode lead electrically connected to the anode terminal of the capacitor element, and a cathode lead electrically connected to the cathode terminal of the chip. Each of the anode and cathode leads partially projects out of the package.

According to an embodiment of the present invention, the diode is mounted on the anode lead and has the negative pole held in direct electrical contact with the anode lead, the positive pole of the diode being electrically connected to the cathode terminal of the chip through a metal wire. Preferably, the anode terminal of the capacitor element is an anode wire projecting from the chip, and the anode wire and the diode are mounted on opposite faces of the anode lead.

According to another embodiment of the present invention, the diode is mounted on the chip and has the positive pole held in direct electrical contact with the anode terminal of the chip, the negative pole of the diode being electrically connected to the anode lead through a metal wire.

According to a further embodiment of the present invention, the cathode terminal of the chip is electrically connected to the cathode lead through a safety fuse wire.

Other objects, features and advantages of the present invention will be fully understood from the following detailed description given with reference to the accompanying drawings.

DETAILED DESCRIPTION OF THE PREFERRED EMBODIMENTS

Figure 1:
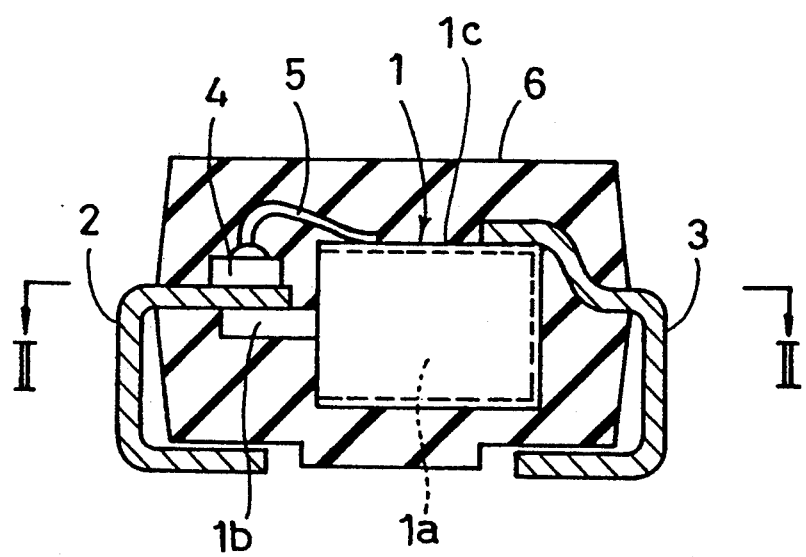
FIG. 1 is a front view, in vertical section, showing a solid electrolytic capacitor embodying the present invention.
Figure 2:
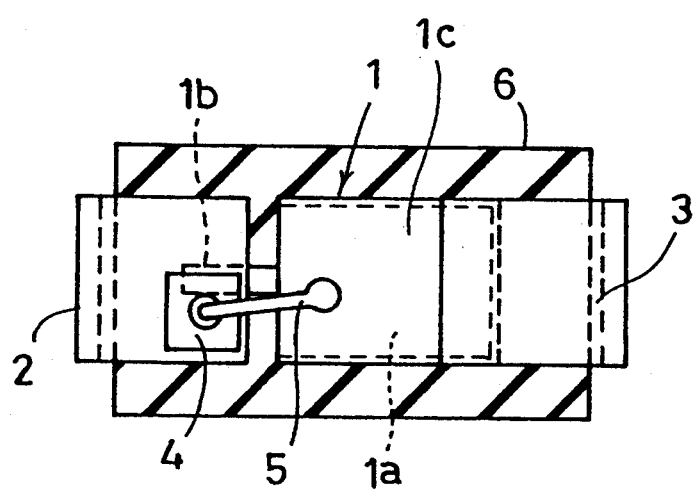
FIG. 2 is a sectional view taken on lines II—II in FIG. 1.
Figure 3:
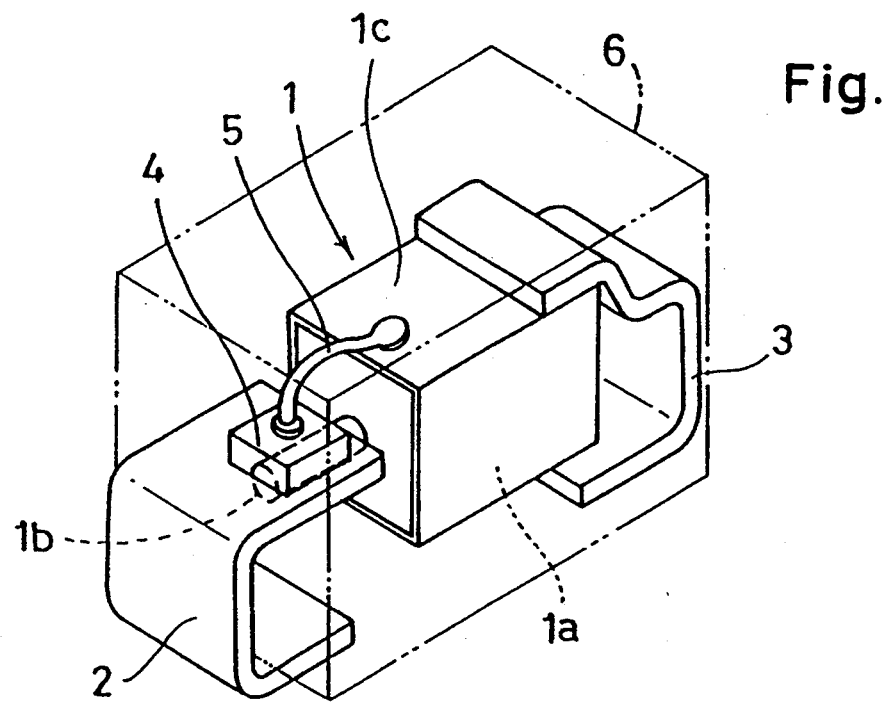
FIG. 3 is a perspective view showing the same capacitor.

Referring first to FIGS. 1 to 3 of the accompanying drawings, there is shown a solid electrolytic capacitor according to a first embodiment of the present invention. The capacitor may be a tantalum capacitor for example.

The capacitor of the first embodiment comprises a capacitor element 1 which includes a chip 1a and an anode wire (anode terminal) 1b projecting from the chip 1a. The chip 1a is covered by a cathode layer (cathode terminal) 1c, except for an end face from which the anode wire 1b projects out.

The chip 1a may be prepared in a conventional manner. Specifically, an amount of tantalum powder is first compacted into a porous body together with the anode wire 1b, and the compact is then sintered. Then, the sintered porous compact is oxidized to form a dielectric substance (e.g. tantalum pentoxide). Then, the oxidized porous compact is subjected to a treatment for forming a solid electrolytic substance (e.g. manganese dioxide). Finally, the thus treated compact is graphitized and metalized (by silver or nickel plating for example) for forming a cathode layer 1c.

The capacitor also includes an anode lead 2 and a cathode lead 3, each of which is in the form of a metal plate. The anode lead 2 is electrically connected, from above, to the anode wire 1b by welding for example. The cathode lead 3 is electrically connected, from above, to the cathode lead 1c of the chip 1a by an electrically conductive paste for example.

The capacitor further includes a PN junction type rectifier diode 4 mounted to the anode lead 2 from above. More specifically, the rectifier diode 4 has its nagative pole (N pole) electrically connected to the anode lead 2. Further, the rectifier diode 4 has its positive pole (P pole) electrically connected to a thin metal wire 5. The characteristics of the rectifier diode 4 is such that a forward current passes through the diode 4 under a forward bias which is lower than the reverse dieletric breakdown voltage of the capacitor element 1.

The capacitor element 1 and the rectifier diode 4 together with part of the respective leads 2, 3 and the metal wire 5 are enclosed in a package 6 of a thermosetting resin (epoxy resin for example). The projecting portions of the respective leads 2, 3 are bent toward the underside of the resin package 6 for conveniently mounting to a surface of a printed circuit board (not shown).

Figure 4:
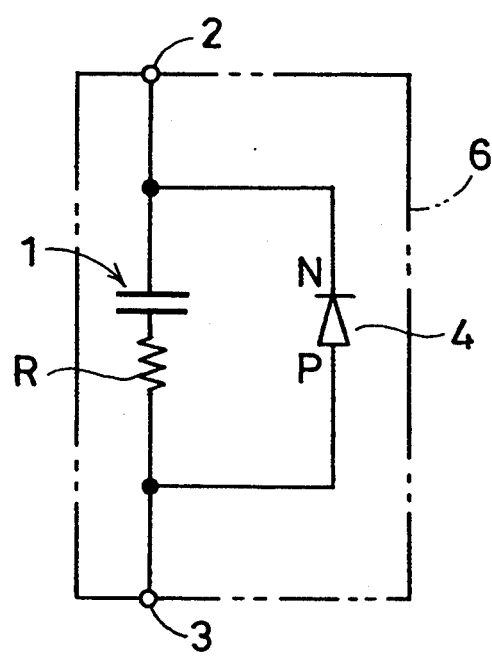
FIG. 4 is a view showing an equivalent circuit arrangement corresponding to the same capacitor.

FIG. 4 shows an equivalent circuit arrangement corresponding to the capacitor of FIGS. 1-3. As clearly appreciated from FIG. 4, the capacitor element 1 is arranged in parallel to the rectifier diode 4 within the same resin package 6, but these two elements 1, 4 are connected in opposite polarity. Specifically, the negative pole (N pole) of the diode 4 is connected to the anode wire 1b (namely, positive or anode lead 2) of the capacitor element 1, whereas the positive pole (P pole) of the diode 4 is connected to the cathode layer 1c (namely, negative or cathode lead 3) of the capacitor element 1. Reference sign R in FIG. 4 represents an internal resistance of the capacitor element 1 resulting from the solid electrolyte substance (e.g. MnO$_2$) of the chip 1a.

With the arrangement described above, when the capacitor is mounted on a circuit board with correct polarity for the capacitor element 1, a forward bias is applied to the capacitor element 1 with a reverse bias applied to the rectifier diode 4. Thus, the diode 4 prevents passage of a reverse current therethrough due to its rectifying function, and the capacitor element 1 provides its intended function.

Conversely, when the capacitor is erroneously mounted on a circuit board with reverse polarity for the capacitor element 1, a reverse bias is increasingly applied to the capacitor element 1 with a delay provided by the internal resistance R. However, since the reverse bias for the capacitor element 1 is a forward bias for the rectifier diode 4, a forward current starts passing through the diode 4 during the above-mentioned delay before the reverse bias for the capacitor element 1 reaches the reverse dieletric breakdown voltage of the capacitor element 1. Thus, the capacitor element 1 is prevented from being dielectrically broken down even if it is erouneously mounted with reverse polarity.

A reverse bias may be also applied to the capacitor element 1 due to some trouble of external circuitry even where the capacitor element 1 is mounted with correct polarity. The same dielectric protection of the capacitor element 1 as described above is also obtainable in such a case.

Due to the dieletric protection provided by the rectifier diode 4, the layer thickness of the dielectric substance of the capacitor element 1 need not be increased for improving its reverse dielectric characteristics. Further, since the rectifier diode 4 is integrated in the resin package 6 of the capacitor, there is no need for separately providing a protective diode, thereby making it possible to prevent a decrease of mounting density for the printed circuit board while also preventing a production cost increase which would result from the need for separately mounting the protective diode.

It should be appreciated that the delay of a reverse bias increase for the capacitor element 1 is determined by the internal resistance R of the capacitor element 1. Thus, the delay time may be prolonged by increasing impurities, such as lower maganese oxide (Mn$_2$O$_3$), contained in the solid electrolytic substance (e.g. MnO$_2$).

According to the first embodiment, further, the anode wire 1b is attached to the lower face of the anode lead 2, whereas the rectifier diode 4 is mounted to the upper face of the anode wire 2. If a single face (either upper or lower face) of the anode lead 2 is used for attachment to both of the anode wire 1b and the diode 4, the width of the anode lead 2 must be increased for enabling arranging the anode wire 1b and the diode 4 side by side, consequently resulting in an increase of size and weight. Such a disadvantage can be avoided by utilizing the opposite faces of the anode lead 2 for attachment to the anode wire 1b and the diode 4.

Figure 5:
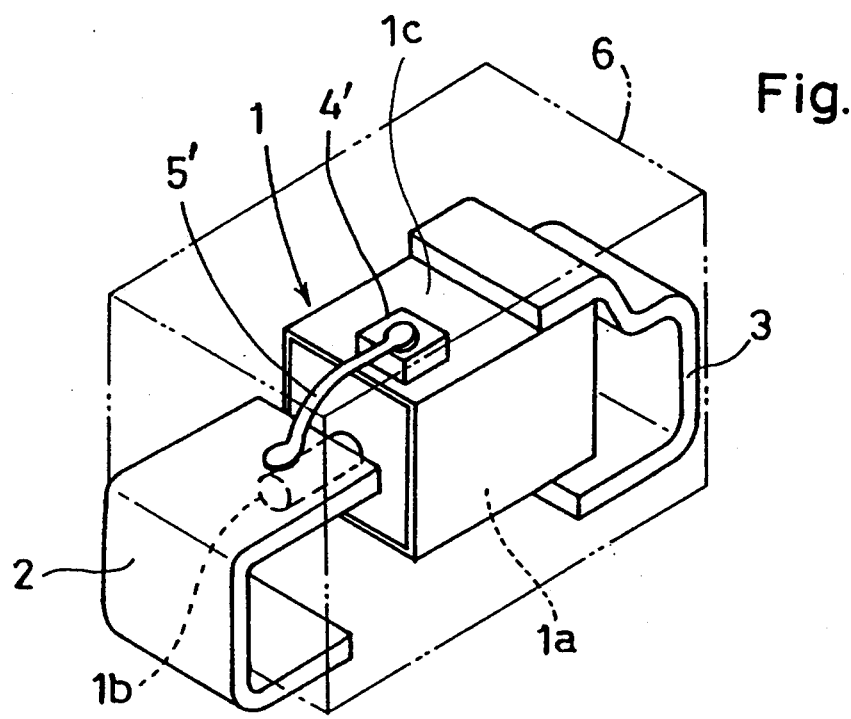
FIG. 5 is a perspective view showing another solid electrolytic capacitor embodying the present invention.

FIG. 5 shows a solid electrolytic capacitor according to a second embodiment of the present invention. The capacitor of this embodiment is similar to that of the first embodiment but differs therefrom only in-the following two points. First, a PN junction type rectifier diode 4' is mounted on the chip 1a of the capacitor element 1 to bring the positive pole (P pole) of the diode 4' into direct electrical contact with the cathode layer 1c of the chip 1. Secondly, the negative pole of the diode 4' is electrically connected to the anode lead 2 through a thin metal wire 5'.

Apparently, the capacitor of the second embodiment operates in substantially the same way as that of the first embodiment. The second embodiment may be slightly modified such that the rectifier diode 4' is mounted in direct contact with the cathode lead 3.

Figure 6:
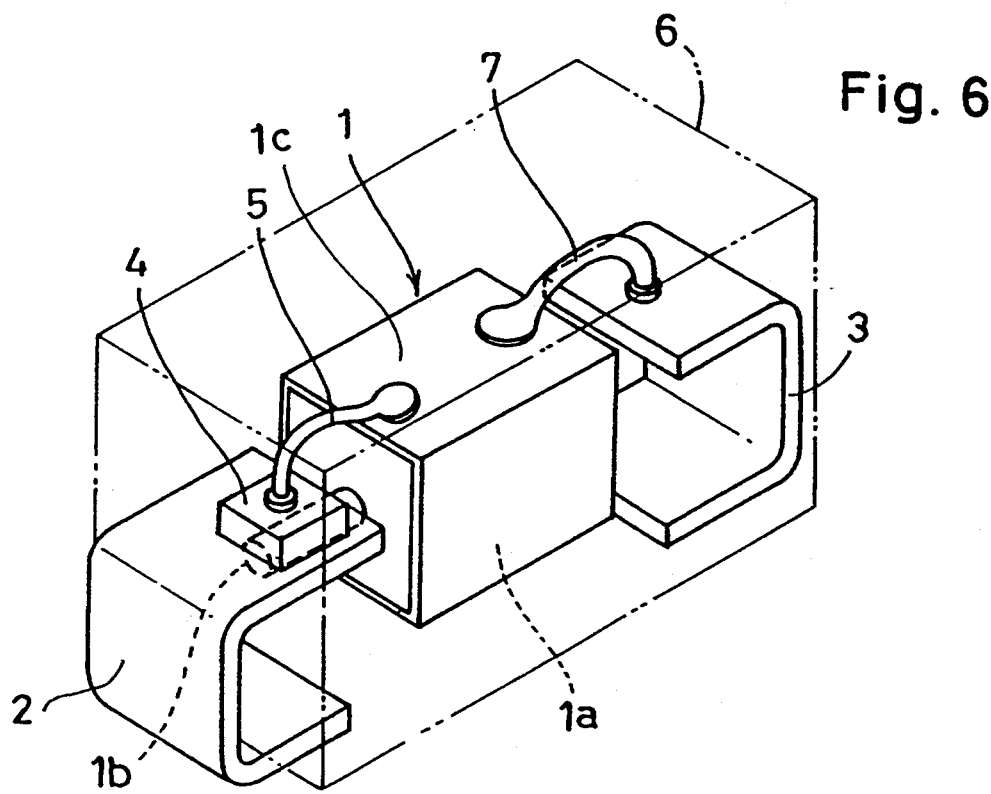
FIG. 6 is also a perspective view showing a further solid electrolytic capacitor embodying the present invention.

FIG. 6 shows a solid electrolytic capacitor according to a third embodiment of the present invention. The capacitor of this embodiment is similar to that of the first embodiment but differs therefrom only in that the cathode layer 1c of the chip 1 is electrically connected to the cathode lead 3 indirectly through a safety fuse wire 7 which may be made of solder for example to serve as a temperature fuse or an overcurrent fuse.

According to the third embodiment, the safety fuse wire 7 is melt-cut upon an excessive temperature rise or upon passage of an overcurrent. Thus, the capacitor is protected against such an abnormality.

Figure 7:
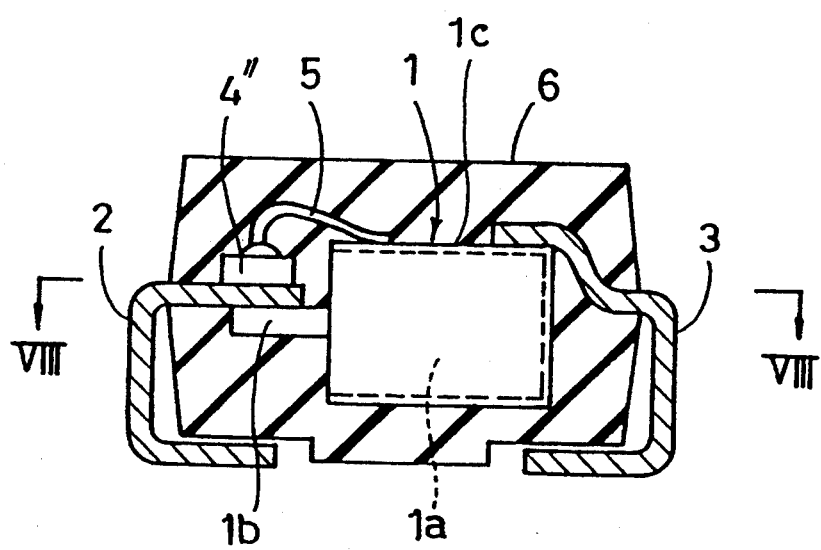
FIG. 7 is a front view, in vertical section, showing still another solid electrolytic capacitor embodying the present invention.
Figure 8:
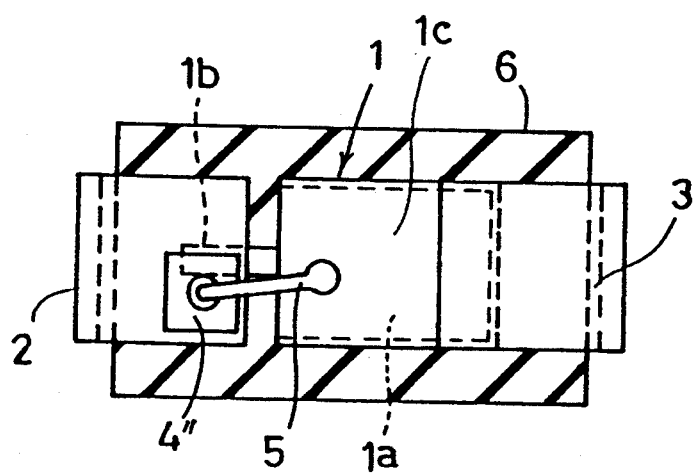
FIG. 8 is a sectional view taken along lines VIII—VIII in FIG. 7.

FIGS. 7 and 8 show a solid electrolytic capacitor according to a fourth embodiment of the present invention. The capacitor of this embodiment is similar to that of the first embodiment but differs therefrom only in that a PN junction type Zener diode 4" is provided instead of the rectifier diode 4, 4'. Like the rectifier diode 4, 4' of each the foregoing embodiments, the characteristics of the Zener diode 4" is such that a forward current passes through it under a forward bias which is lower than the reverse dieletric breakdown voltage of the capacitor element 1. Further, the Zener diode 4" is also designed to provide a Zener voltage (under reverse bias) which is lower than the forward dielectric breakdown voltage.

Figure 9:
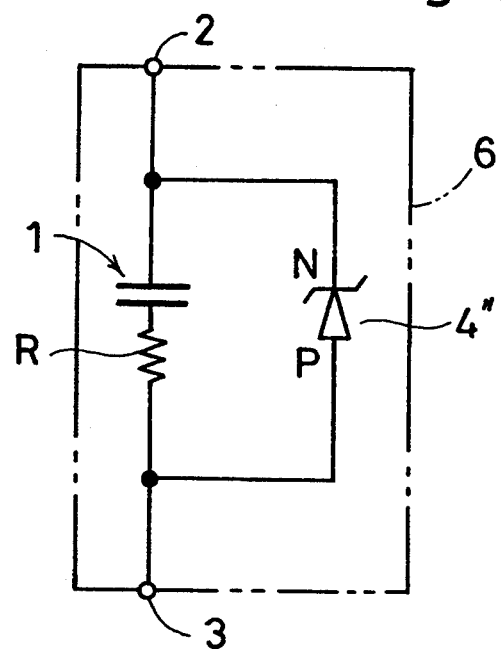
FIG. 9 is a view showing an equivalent circuit arrangement corresponding to the capacitor of FIG. 7.

FIG. 9 shows an equivalent circuit arrangement corresponding to the capacitor of the fourth embodiment. As clearly appreciated from this figure, the Zener diode 4" is arranged in parallel to the capacitor element 1 within the same resin package 6, but these two elements 1, 4" are connected in opposite polarity.

According to the fourth embodiment, when a reverse bias is applied to the capacitor element 1, the Zener diode 4" operates in the same way as the rectifer diode 4, 4" of each of the foregoing embodiments for reliably preventing the capacitor element 1 from dielectrically breaking down under the reverse bias which corresponds to a forward bias for the Zener diode 4"

Conversely, when a forward bias is applied to the capacitor element 1, a reverse bias is applied to the Zener diode 4". In this case, as long as the reverse bias for the diode 4" is lower than the Zener voltage thereof, the diode 4" prevents passage of a reverse current therethrough to keep the normal operation of the capacitor element 1. However, if the reverse bias for the diode 4" increases above the Zener voltage due to some trouble in the external circuitry, a reverse current abruptly starts passing through the Zener diode 4" due to a nondestructive breakdown (Zener breakdown) of the diode 4". Since the Zener voltage of the diode 4" is set lower than the foward dielectric breakdown voltage of the capacitor element 1 according to the fourth embodiment, the capacitor element 1 is reliably prevented from dielectrically breaking down due to an abnormal increase of forward biase.

Apparently, the rectifier diode 4' used in the second or third embodiment (FIG. 5 or 6) may be replaced by a Zener diode for preventing dielectric breakdown of the capacitor element 1 under abnormally high forward bias.

The present invention being thus described on the basis of the preferred embodiments, it is obvious that the same may be varied in many ways. Such variations are not to be regarded as a departure from the spirit and scope of the present invention, and all such modifications as would be obvious to those skilled in the art are intended to be included within the scope of the following claims.

I claim:

1. A package-type solid electrolytic capacitor comprising:

a capacitor element including a chip having a cathode terminal, the capacitor element further including an anode terminal electrically separated from the cathode terminal; and a package enclosing the capacitor element;

wherein the capacitor further comprises a diode enclosed commonly in the package for the capacitor element, the diode having a negative pole electrically connected to the anode terminal of the capacitor element, the diode further having a positive pole electrically connected to the cathode terminal of the chip; and wherein the diode allows passage therethrough of a forward current under a forward bias which is lower than a reverse dielectric breakdown voltage of the capacitor element.

2. The capacitor according to claim 1, wherein the diode is a rectifier diode.

3. The capacitor according to claim 1, wherein the diode is a Zener diode.

4. The capacitor according to claim 3, wherein the Zener diode has, under reverse bias, a Zener voltage which is lower than a forward dielectric breakdown voltage of the capacitor element.

5. The capacitor according to claim 1, further comprising an anode lead electrically connected to the anode terminal of the capacitor element, and a cathode lead electrically connected to the cathode terminal of the chip, each of the anode and cathode leads partially projecting out of the package.

6. The capacitor according to claim 5, wherein the diode is mounted on the anode lead and has the negative pole held in direct electrical contact with the anode lead, the positive pole of the diode being electrically connected to the cathode terminal of the chip through a metal wire.

7. The capacitor according to claim 6, wherein the anode terminal of the capacitor element is an anode wire projecting from the chip, the anode wire and the diode being mounted on opposite faces of the anode lead.

8. The capacitor according to claim 5, wherein the diode is mounted on the chip and has the positive pole held in direct electrical contact with the anode terminal of the chip, the negative pole of the diode being electrically connected to the anode lead through a metal wire.

9. The capacitor according to claim 5, wherein the cathode terminal of the chip is electrically connected to the cathode lead through a safety fuse wire.

* * * * *